US010583639B2

(12) United States Patent
Faris

(10) Patent No.: US 10,583,639 B2
(45) Date of Patent: Mar. 10, 2020

(54) MULTILAYER STACK OF POLYMER FILMS

(71) Applicant: Vampire Optical Coatings, Inc., Pataskala, OH (US)

(72) Inventor: Tom Faris, Pataskala, OH (US)

(73) Assignee: VAMPIRE OPTICAL COATING, INC., Pataskala, OH (US)

( * ) Notice: Subject to any disclaimer, the term of this patent is extended or adjusted under 35 U.S.C. 154(b) by 665 days.

(21) Appl. No.: 14/806,269

(22) Filed: Jul. 22, 2015

(65) Prior Publication Data

US 2016/0023442 A1 Jan. 28, 2016

Related U.S. Application Data

(60) Provisional application No. 62/027,544, filed on Jul. 22, 2014.

(51) Int. Cl.
*B32B 7/06* (2019.01)
*B32B 7/12* (2006.01)
*B32B 27/30* (2006.01)
*B32B 27/36* (2006.01)
*B32B 27/40* (2006.01)
*B32B 27/08* (2006.01)

(52) U.S. Cl.
CPC .............. *B32B 27/308* (2013.01); *B32B 7/06* (2013.01); *B32B 7/12* (2013.01); *B32B 27/08* (2013.01); *B32B 27/36* (2013.01); *B32B 27/365* (2013.01); *B32B 27/40* (2013.01); *B32B 2255/10* (2013.01); *B32B 2255/26* (2013.01); *B32B 2307/412* (2013.01); *B32B 2307/554* (2013.01); *B32B 2307/584* (2013.01); *B32B 2307/71* (2013.01); *B32B 2307/714* (2013.01); *B32B 2307/748* (2013.01); *B32B 2551/00* (2013.01); *B32B 2605/006* (2013.01); *Y10T 428/14* (2015.01); *Y10T 428/1471* (2015.01)

(58) Field of Classification Search
CPC .............. Y10T 428/14; Y10T 428/1471; B32B 2255/10; B32B 2255/26; B32B 2307/412; B32B 2307/554; B32B 2307/584; B32B 2307/71; B32B 2307/714; B32B 2307/748; B32B 2551/00; B32B 2605/006; B32B 27/08; B32B 27/308; B32B 27/36; B32B 27/365; B32B 27/40; B32B 7/06; B32B 7/12
See application file for complete search history.

(56) References Cited

U.S. PATENT DOCUMENTS

| 2,511,329 | A |   | 6/1950  | Craig                    |
|-----------|---|---|---------|--------------------------|
| 3,132,065 | A | * | 5/1964  | Barsy .......... D06N 7/0042 |
|           |   |   |         | 361/220                  |
| 3,785,102 | A |   | 1/1974  | Amos                     |
| 4,076,373 | A |   | 2/1978  | Moretti                  |
| 4,138,746 | A |   | 2/1979  | Bergmann                 |
| 4,332,861 | A |   | 6/1982  | Franz et al.             |
| 4,716,601 | A |   | 1/1988  | McNeal                   |
| 4,842,919 | A |   | 6/1989  | David                    |
| 5,002,326 | A |   | 3/1991  | Westfield                |
| 5,104,929 | A |   | 4/1992  | Bilkadi                  |
| 5,194,293 | A |   | 3/1993  | Foster                   |
| 5,242,719 | A | * | 9/1993  | Medford .......... B05D 3/067 |
|           |   |   |         | 427/515                  |
| 5,420,649 | A |   | 5/1995  | Lewis                    |
| 5,443,877 | A |   | 8/1995  | Kramer et al.            |
| 5,512,116 | A |   | 4/1996  | Campfield                |
| 5,592,698 | A |   | 1/1997  | Woods                    |
| 5,633,049 | A |   | 5/1997  | Bilkadi et al.           |
| 5,780,117 | A | * | 7/1998  | Swartz .......... C08G 59/18 |
|           |   |   |         | 427/493                  |
| 5,792,535 | A |   | 8/1998  | Weder                    |
| 5,972,453 | A |   | 10/1999 | Akiwa et al.             |
| 5,991,072 | A |   | 11/1999 | Solyntjesv et al.        |
| 6,045,895 | A | * | 4/2000  | Hyde .......... B32B 7/02  |
|           |   |   |         | 428/213                  |
| 6,085,358 | A |   | 7/2000  | Cogan                    |
| 6,388,813 | B1|   | 5/2002  | Wilson                   |
| 6,461,709 | B1|   | 10/2002 | Janssen et al.           |
| 6,536,045 | B1| * | 3/2003  | Wilson .......... A42B 3/26 |
|           |   |   |         | 2/15                     |
| 6,660,389 | B2|   | 12/2003 | Liu et al.               |
| 6,777,055 | B2|   | 8/2004  | Janssen et al.           |
| 6,847,492 | B2|   | 1/2005  | Wilson                   |
| 6,870,686 | B2|   | 3/2005  | Wilson                   |
| 7,184,217 | B2|   | 2/2007  | Wilson                   |
| 7,238,401 | B1|   | 7/2007  | Dietz                    |
| 7,540,039 | B2|   | 6/2009  | Reaux                    |
| 8,277,916 | B2|   | 10/2012 | Cockman et al.           |
| 8,292,347 | B1|   | 10/2012 | Drake et al.             |
| 8,322,775 | B1|   | 12/2012 | Barbee et al.            |
| 8,693,102 | B2|   | 4/2014  | Wilson et al.            |
| 8,974,620 | B2|   | 3/2015  | Wilson et al.            |
| 2002/0159159 | A1 | * | 10/2002 | Wilson .......... A42B 3/26 |
|           |   |   |         | 359/630                  |
| 2004/0258933 | A1 | * | 12/2004 | Enniss .......... B32B 7/06 |
|           |   |   |         | 428/480                  |
| 2005/0130527 | A1 | * | 6/2005  | Sebastian .......... C09J 7/04 |
|           |   |   |         | 442/149                  |
| 2008/0176018 | A1 | * | 7/2008  | Enniss .......... B07C 5/3427 |
|           |   |   |         | 428/41.8                 |
| 2011/0283443 | A1 |   | 11/2011 | Simpson                  |

(Continued)

FOREIGN PATENT DOCUMENTS

GB        1317931 A  *  5/1973  .............. C08F 8/44

Primary Examiner — John D Freeman
(74) Attorney, Agent, or Firm — Tarolli, Sundheim, Covell & Tummino LLP

(57) ABSTRACT

An article includes a plurality of stacked sheets. Each sheet includes a film having a first side, with a print receptive or primed layer, and a second side, with an optional release treated layer; and a bonding layer that is coated at 100% solids on the first side of the film to releasably attach a second side of a film of an overlying sheet to the first side of an underlying sheet. Each sheet is stacked upon another sheet such that except for a topmost sheet of the stack the bonding layer is in contact with the second side of a film of an overlying sheet. The bonding layer of the topmost sheet defines an outer surface of the stack that protects the topmost sheet of the stack from environmental damage.

18 Claims, 1 Drawing Sheet

(56) References Cited

U.S. PATENT DOCUMENTS

| | | | |
|---|---|---|---|
| 2013/0029077 A1* | 1/2013 | Yoon | G06F 3/041 428/41.8 |
| 2014/0065397 A1* | 3/2014 | Johnson | B32B 27/08 428/220 |
| 2015/0194541 A1 | 7/2015 | Spagnola et al. | |

* cited by examiner

MULTILAYER STACK OF POLYMER FILMS

RELATED APPLICATION

This application claims priority from U.S. Provisional Application No. 62/027,544, filed Jul. 22, 2014, the subject matter of which is incorporated herein by reference in its entirety.

FIELD OF THE INVENTION

This invention relates to an article that includes a multi-layer stack of polymer films and to the use of the article as a multi-layer lens construction or as a graffiti prevention film for windows, displays, touch panels and to prevent damage and abuse from permanently marring a surface while facilitating easy removal of damaged or soiled surfaces.

BACKGROUND

It is common in the medical sector, in racing sports and in the window/security film industry to deploy single layers of film to reduce the potential for damage or obstruction to clear sight. In many cases, it is advantageous to be able to simply remove and replace dirty or scratched lenses or window films. However, there are cases where one is not in a work environment that allows the time required for such removal and replacement, such as an operating room or driving a motorcycle. This creates a problem. Either one continues with occluded vision, removes eye protection or stops working to take the time to remove and replace the dirty lens of the protective appliance.

Wilson et al. in U.S. Pat. No. 6,388,813 describe film construction that resolved many of these issues for lens systems. The construction is a multi-layer film construction of thin pressure sensitive adhesives interposed between clear polyethylene terephthalate sheets. The adhesive was coated, dried and laminated to the next adjacent sheet in the multi-layer stack eliminating air gaps that cause reflections and providing an appliance that had many sacrificial layers in the case of damage. The disadvantage of this construction is that there is no provision for an abrasion, scratch and chemical resistant surface; thus, the utility is limited to sectors of low use and abuse or disposable items.

Westfield et al. in U.S. Pat. No. 5,002,326 describe a windshield protector comprised of multiple layers of pressure sensitive adhesive coated polycarbonate film. The adhesive was coated, dried, and laminated to form a stack of protection film with a structure that allowed clean removal of the upper sheets and its associated adhesive from the next sheet in the multi-layer stack to reveal a clean fresh undamaged surface. The design and construction, as described, does not allow for cleaning or the incorporation of scratch and abrasion resistant properties.

While single layer security or anti-graffiti films do not suffer from the same time constraints for prompt removal, glass windows and the like suffer from their own unique set of problems, especially in the public transit sector. Although graffiti is a significant issue within the public transit industry; graffiti on metal, concrete or most surfaces can be washed away with cleaning solvents or simply painted over. Windows are different. Once windows in subways, buses and other areas of high use are scratched or damaged, either the window is left in service with the damage or the window must be replaced at high cost to the transit authority. Neither solution is very attractive—either the transit authority suffers damage to its reputation or it suffers high replacement costs. Single layer security films that are comprised of a single layer of adhesive coated chemical and abrasion resistant film are one of the solutions to the problem of scratching on glass; however, these films can be scratched as well and once they are, they must be replaced at relatively high removal and reinstallation costs.

Janssen et al. in U.S. Pat. No. 6,461,709 describe an article that includes a multi-layer chemical and abrasion resistant film to address the issues with single layer films, sacrificial plies and other solutions to graffiti in the transit market. The article consists of a UV curable abrasion and chemical resistant coating, which is cast onto the first side of a PET film from solvent, dried and cured with actinic radiation to produce a low surface energy abrasion and chemical resistant film. The '709 patent further describes coating from solvent of various pressure sensitive adhesive formulations onto the second side, which may have primer layers on it, of the same PET film, drying and laminating this adhesive coated side to the first side of a substantially identical film to create multi-layer stacks of abrasion, scratch and chemically resistant film with more than 1 removable layer.

SUMMARY

Embodiments described herein relate to an article that includes a stack of sheets and to the use of the article as a multi-layer lens construction or as a graffiti prevention film for windows, displays, touch panels and to prevent damage and abuse from permanently marring a surface while facilitating easy removal of damaged or soiled surfaces. Each sheet includes a chemical and abrasion resistant bonding layer that releasably attaches an underlying sheet to an overlying sheet of the stack. The bonding layer of a topmost sheet of the stack can define an outer surface of the stack that protects the topmost sheet of the stack from environmental damage including chemical and/or abrasion damage. The topmost sheet can be removed from the stack of sheets by pulling it away from the stack such that a bonding layer of the underlying sheet forms a new or undamaged outer surface of the stack that protects the underlying sheet from environmental damage. As the outer surface of the stack is damaged, each sheet can be removed from the stack by a simple operation to expose the new or undamaged chemical and abrasion resistant surface. The stack of sheets can be efficiently produced, provide fast efficient removal of graffiti damaged surfaces, at low cost; thereby, facilitating implementation of a zero tolerance graffiti policy in public transportation.

In some embodiments, each sheet of the stack of sheets can include a film having a first side, with a print receptive or primed surface or layer, and a second side, with an optional release treated layer and a bonding layer that is coated at 100% solids on the first side of the film to releasably attach a first side of a film of an underlying sheet to the second side of an overlying sheet. Each sheet can be stacked upon another sheet such that except for a topmost sheet of the stack the bonding layer is in contact with the second side of a film of an overlying sheet. The bonding layer of the topmost sheet can an outer surface of the stack that protects the topmost sheet of the stack from environmental damage. The topmost sheet can be removed from the stack of sheets by pulling it away from the stack such that a bonding layer of the underlying sheet forms an outer surface of the stack that protects the underlying sheet from environmental damage.

DETAILED DESCRIPTION

Embodiments described herein relate to an article that includes a stack of sheets and to the use of the article as a multi-layer lens construction or as a graffiti prevention film for windows, displays, touch panels and to prevent damage and abuse from permanently marring a surface while facilitating easy removal of damaged or soiled surfaces. Each sheet includes a chemical and abrasion resistant bonding layer that releasably attaches an underlying sheet to an overlying sheet of the stack. The bonding layer of a topmost sheet of the stack can define an outer surface of the stack that protects the topmost sheet of the stack from environmental damage including chemical and/or abrasion damage. The topmost sheet can be removed from the stack of sheets by pulling it away from the stack such that a bonding layer of the underlying sheet forms a new or undamaged outer surface of the stack that protects the underlying sheet from environmental damage. As the outer surface of the stack is damaged, each sheet can be removed from the stack by a simple operation to expose the new or undamaged chemical and abrasion resistant surface. The stack of sheets can be efficiently produced, provide fast efficient removal of graffiti damaged surfaces, at low cost; thereby, facilitating implementation of a zero tolerance graffiti policy in public transportation.

Figure 1:
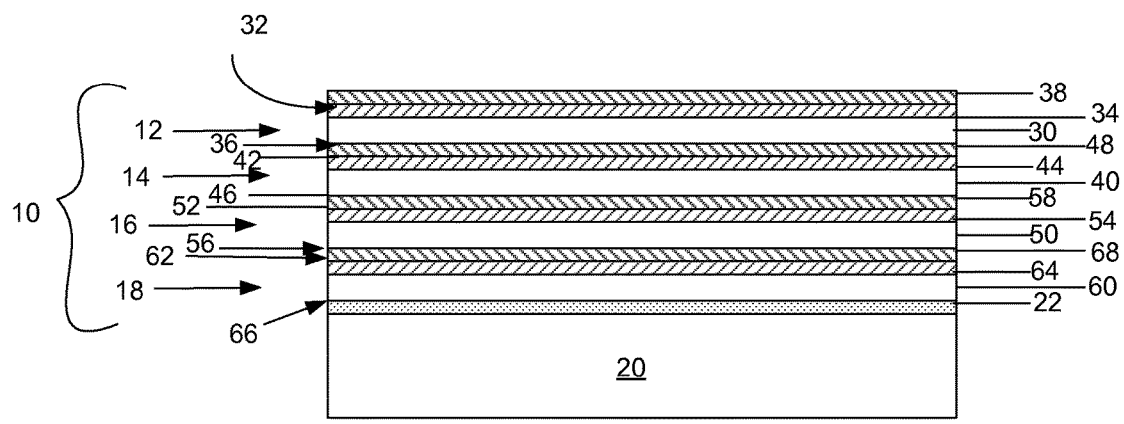
FIG. 1 is a cross-sectional view of a stack in accordance with an embodiment described herein.

FIG. 1 illustrates a stack 10 of four sheets 12, 14, 16 and 18 in accordance with an embodiment described herein. The stack 10 is bonded to a substrate 20 via an adhesive layer 22. While the stack 10 is illustrated as having four sheets, the stack and can include more or less sheets. In some embodiments, the stack can include about 2 to about 10 sheets.

Sheet 12 is the topmost sheet of the stack 10 and includes a film 30 having a first side 32, with a print receptive or primed layer 34, and a second side 36. Sheet 12 also includes a bonding layer 38 that is coated at 100% solids on the first side 32 of the film 30. The bonding layer 38 of the topmost sheet 12 is chemical and abrasion resistant and can define an outer surface of the stack 10 that protects the topmost sheet 12 of the stack 10 as well as the substrate 20 from environmental damage.

Sheet 14 includes a film 40 having a first side 42, with a print receptive or primed layer 44, and a second side 46. Sheet 14 also includes a bonding layer 48 that is coated at 100% solids on the first side 42 of the film 40. The bonding layer 48 of sheet 16 is chemical and abrasion resistant and releasably attaches the second side 36 of the film 30 to the first side 42 of the film 40.

Sheet 16 includes a film 50 having a first side 52, with a print receptive or primed layer 54, and a second side 56. Sheet 16 also includes a bonding layer 58 that is coated at 100% solids on the first side 52 of the film 50. The bonding layer 58 of sheet 16 is chemical and abrasion resistant and releasably attaches the second side 46 of the film 40 to the first side 52 of the film 50.

Sheet 18 includes a film 60 having a first side 62, with a print receptive or primed layer 64, and a second side 66. Sheet 18 also includes a bonding layer 68 that is coated at 100% solids on the first side 62 of the film 60. The bonding layer 68 of sheet 18 is chemical and abrasion resistant and releasably attaches the second side 56 of the film 50 to the first side 62 of the film 60.

The topmost sheet 12 can be removed from the stack 10 of sheets by pulling it away from the stack such that the bonding layer 38 of the underlying sheet 14 forms an outer surface of the stack 10 that protects the underlying sheet 14 and substrate 20 from environmental damage.

Figure 2:
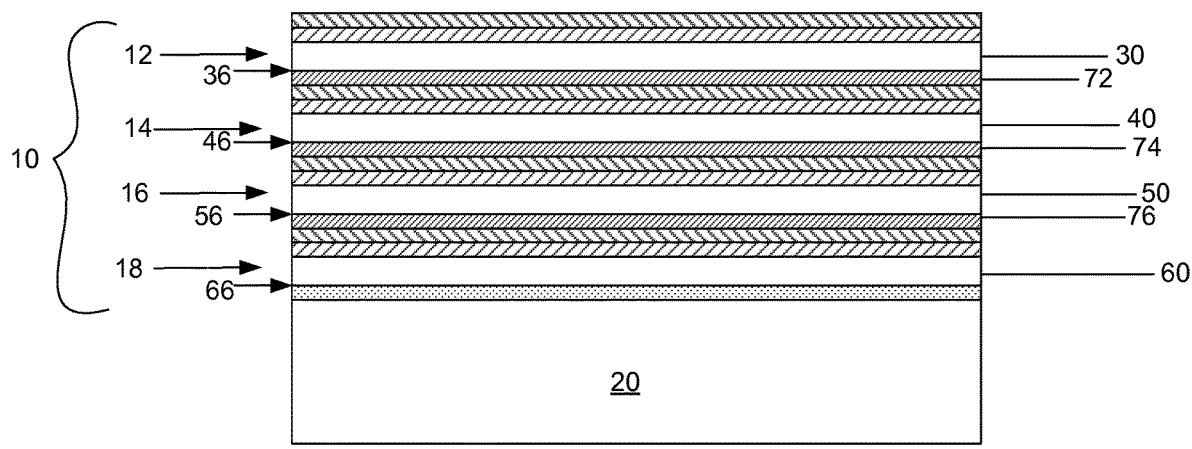
FIG. 2 is a cross-sectional view of a stack in accordance with another embodiment described herein.

Optionally, as illustrated in FIG. 2, the second sides 36, 46, and 56 of the films 30, 40, and 50 of each sheet 12, 14, and 16 can include a release layer 72, 74, and 76 that provides a release surface for the bonding layer on the underlying sheet. The second side 66 of the film 60 of sheet 18 is illustrated as not including a release layer as this sheet is adhered to the substrate, but can include a release layer, if desired.

The films 30, 40, 50, and 60 used to form the sheets can include any transparent or substantially transparent polymer or plastic film. By substantially transparent, it is meant that the film does not significantly impair visible light transmission through the film, and the film is at least about 75%, at least about 85%, at least about 90%, at least about 95%, or at least about 99% transmissive to visible light as measured in accordance with ASTM D1003. Each film includes a first side and an opposite second side that extends substantially parallel to first side.

In some embodiments, each film can include or be formed from one or more polymers, such as polyester, polycarbonate, acrylic, polyurethanes, poly acetyl, polyolefin based ionomers, ethylene vinyl acetate polymers, polyethylene, polypropylene, polyvinyl chloride, polystyrene, urethane acrylate polymers, epoxy polymers, epoxy acrylate polymers, copolymers thereof, or blends thereof. In some embodiments, the film can be made of a polymeric material, such as polyester (e.g., polyethylene terephthalate (PET)), polycarbonate, polymethyl methacrylate (PMMA), or aliphatic polyurethane. The polymer or polymeric material used to form each film can be the same or different so that the stack includes a plurality of sheets having films formed from the same polymer or plurality of sheets having films formed from differing polymers, e.g., one, two, three, or more differing polymer films.

The thicknesses of the films can depend on the type of damage that the stack of sheets may be subjected to and the composition of the film. In some embodiments, the thicknesses of the films can be the same or different and vary from about 12.5 microns to greater than about 750 microns depending on the requirements of the application. In other embodiments, the thicknesses of films can be substantially uniform and vary from about 50 microns to about 175 microns. The film can optionally further comprise stabilizers and fillers, such as UV stabilizers and absorbers, which enhance the durability of the film upon exposure to ultraviolet light and/or heat. Additives can also be incorporated into the film that reduce the flammability of the film or smoke generation during combustion.

The print receptive layer or prime layers 34, 44, 54, or 64 of the first sides 32, 42, 52, and 62 of each film 30, 40, 50, and 60 can be used to provide an adhesion promoting interface between the bonding layer and the film of the same sheet. In some embodiments, the print receptive layer or prime layer can be formed on the first side of each film by treating a surface of the first side of each film with via corona discharge treatments in a variety of atmospheres or by using a flame in order to promote adhesion between the bonding layer and the film of the same sheet. In other embodiments, the print receptive layer or prime layer can be formed on the first side of each film by treating the first side of each film with an aziridine based primers, polyurethanes, acrylics, polyvinylidene chloride and solution coated polymers, solution coated polyesters.

The print receptive layer or prime layer can be, for example, a high tack pressure sensitive adhesive with a composition similar to the bonding layer. It can also, for example, be a coextruded interface prepared as a component of the film or resin solution coated on the film.

The bonding layers 36, 46, 56, and 66 are coated on the first sides 32, 42, 52, and 62 of films 30, 40, 50, and 60 to releasably attach the first sides of the films of underlying sheets to second sides of films of overlying sheets as well as to provide chemical and abrasion resistance to the sheets from environmental damage when the sheet is the topmost sheet of the stack and defines the outer surface of the stack. The bonding layer provides a stable bond between underlying and overlying sheets and prevents premature separation of the sheets under the environmental conditions anticipated in the application of the stack. In some embodiments, it can provide an optically clear interface between the films of the sheets. The bonding layer binds more readily to the film of the underlying sheet than to the film of the overlying sheet so than when the topmost sheet of the stack is removed by, for example, pulling the topmost sheet of the stack away from the stack, the underlying sheet of the topmost sheet is exposed and the bonding layer of the underlying sheet is retained on the underlying sheet to protect the underlying sheet from environmental damage, such as abrasion and chemical damage.

In some embodiments, the bonding layer can maintain scratch resistance of the surface of the film. For example, the exposed bonding layer can exhibit a high resistance to scratching with #0000 steel. The bonding layer can optionally be selected to improve the Taber Abrasion Resistance of the sheet, for example, by at least about 10%, at least about 25%, at least about 50%, at least about 75% or more.

The bonding layers can be formed from a 100% solids continuous or substantially continuous coating of a bonding agent that is applied to the print receptive layer or primer layers of the first sides of the films. In some embodiments, at least about 80%, at least about 90%, or 100% of the first sides of the films has a bonding agent bonded thereto in order to maintain the sheets from being prematurely displaced. The bonding layers can be continuous or substantially continuous in order to eliminate air pockets beneath and bumps in adjacent films or sheets. In addition, the bonding layer can remain clear after environmental exposures.

The bonding agent can include most commercially available acrylate monomers/oligomers, urethane acrylate materials, meth-acrylate monomers/oligomers, epoxy monomers/oligomers, cationic UV curable formulations, dual cure cationic UV and radical UV systems, cyano-acrylate monomers and the like. Advantageously, the bonding layer can have a higher chemical and abrasion resistance than the film to which it is bonded. It will be appreciated that multiple combinations of monomers can be selected that will yield good adhesion, good cure response and the required mechanical and optical properties.

The bonding layer may optionally include at least one of tackifiers, oils, stabilizers, flame retardants, fillers, or mixtures thereof. The stabilizers can include UV light absorbers, UV light stabilizers and mixtures thereof to inhibit UV light degradation of the stack. The UV light absorbers, UV light stabilizers and mixtures thereof include, for example, hindered amine light stabilizers and substituted benzophenones, such as 4-dihydroxy-benzophenone; 2-hydroxy-4-acryloxyethoxy-benzophenone; 2-hydroxy-4-methoxy-benzophenone; 2,2'-dihydroxy-4-methoxy-benzophenone; 2,2'-dihydroxy-4,4'-dimethoxy-benzophenone; 2-hydroxy-4-n-octyloxy-benzophenone; 2,2',4,4'-tetrahydroxy-benzophenone; and 4-dodecyloxy-2-hydroxy-benzophenone. Suitable benzotriazoles include 2-[2'-hydroxy-3',5'-di(a,a-dimethyl-benzyl)phenyl]-benzotriazole, 2-(2'-hydroxy-5'-methylphenyl)-benzotriazole, 2-(3',5'-di-t-butyl-2'-hydroxyphenyl)-5-chlorobenzotriazole, 2-(3'-t-butyl-2'-hydroxy-5'-methylphenyl)-5-chlorobenzotriazole, 2-(2'-hydroxy-3',5'-di-t-butylphenyl)-benzotriazole, 2-(2'-hydroxy-5'-t-octylphenyl)-benzotriazole, and 2-(2'hydroxy-3',5'-di-tertiary amylphenyl)-benzotriazole.

The amount of UV light absorbers, UV light stabilizers and mixtures thereof provided in the bonding layer can be an amount effective to inhibit degradation of the stack or article from ultraviolet radiation, for example, about 0.5 to about 1 percent by weight based on the total weight of the bonding layer.

In some embodiments, the bonding layer can have a thickness of about 1 micron to about 25 microns, for example, about 2 microns to about 10 microns, or about 2.5 microns to about 8 microns.

The optional release layers 72, 74, and 76 provided on the second sides of the films can provide a release surface for the bonding layer on the underlying sheet. This optional release layer can be bonded to the second sides of the films in a manner so as to maintain the bond after a variety of environmental exposures. It can form a stable adhesion to the bonding layer and provides a consistent surface for removal of the sheet to which it is adhered.

The release layer, if present can have a thickness ranging from about 0.1 to about 25 microns, more preferably about 2.5 to about 5 microns.

In some embodiments, the release layer comprises a material selected from the group consisting of acrylates, methacrylates, urethanes, polyolefins, silicones, fluorochemicals such as fluorocarbons, and mixtures thereof.

The release layer may provide uniform release performance across the sheet. Optionally, a differential release layer can be coated on the second sides of the films. Such a differential release layer can be used to make the initial separation of a sheet from the stack of sheets easier. Differential release can be obtained, for example, by coating a material providing easy release at the edge and/or corner of the sheet and coating a material providing tighter release on the balance of the sheet surface.

The release layer is not required if the bonding layer is anchored well to the first side of the film. For example, the first side of the film coated with the bonding layer may be chemically primed or oxidized with a corona discharge treatment or flame treatment. The second side of the film not coated with the bonding layer would be free of surface treatments. This adhesion differential between the two sides of the film facilitates clean separation of sheets from the stack.

In some embodiments, the stack of sheets can be made by preparing a first side of a first film with a print receptive or primed surface by, for example, chemically priming or oxidizing the first side of the film with a corona discharge treatment or flame treatment. A curable liquid bonding agent, such as an ultraviolet curable liquid bonding agent, can then be applied to the primed surface of first film. A second film with a print receptor or primed surface on a first side of the film and optionally including a release layer on a second side of the second film can then be laminated to the first side of the first film while the bonding agent is in the liquid state such that second side of the second film overlies the first side of the first film covered with the bonding agent. The liquid can be cured to provide a bonding layer that releasably adheres the second film to the first film. A curable liquid bonding agent can then be applied to the primed surface of the overlying second film, and a third film with a print receptor or primed surface on a first side of the film and optionally including a release layer on a second side of the second film can be laminated to the second film. The liquid can be cured resulting in a stack of three sheets. This lamination and curing process can be repeated until the desired number of sheets in a stack is obtained. A coating of bonding agent can be applied to the topmost sheet to provide the topmost sheet with a chemical and abrasion resistant bonding layer.

The stack of sheets so formed can include, for example, about 2 to about 9 sheets and be transparent or substantially transparent to visible light. The stack can also have differential adhesion between individual sheets such that the outermost sheet can be readily removed from the stack of sheets without removing underlying sheets from the stack.

In each of the previously described embodiments, the sheets may be provided with a film removal means (not shown) for individually removing a sheet from the laminated structure. In one example of the sheet removal means, each sheet may further comprise a stripper tab provided at the edge of the sheet. The outermost sheet may be removed by gripping the tab and pulling the sheet away from the stack.

In another embodiment, the sheet removal means may be a recess that is provided in each of the films or sheets. The outmost sheet may be removed from the laminated stack by inserting one's thumbnail or a thin tool into the recess and under the sheet, then peeling-away the outermost sheet.

In still another embodiment, the outermost sheet may be removed by gripping the sheet with an adhesive wand and then pulling the sheet away from the laminated stack.

In yet another example, each sheet can have a hole that extends through that sheet. The holes in the sheets can be staggered such that the holes do not overlap and wherein the outermost sheet may be removed by using a tool (such as a pick) which can be inserted into the hole of the outermost sheet and used to pull that sheet away from the laminated stack.

In another embodiment, at least a portion of a margin of the sheet does not have bonding material bonded thereto in a similar location such that the topmost sheet can be removed by grasping the portion of the sheet without bonding agent bonded thereto and pulling it away from the stack. Preferably for each sheet the portion of the margin which does not have bonding agent bonded thereto is a corner of the sheet.

In another embodiment, at least a portion of a margin of the bonding agent is detackified in a similar location wherein the topmost sheet can be removed by grasping the sheet where the bonding agent is detackified and pulling it away from the stack. For each sheet the portion of the margin where the bonding material is detackified can be a corner of the sheet.

The stack 10 of sheets or article comprising the stack 10 of sheets can be adhered using optical adhesives to a substrate 20, such as windows in buses, light rail or subways to prevent permanent damage to the windows by vandals. If damage does occur, it is easily removed with minimal time and effort. Further, the sheets of this design can be used to protect underlying plastic surfaces from damage by the weather, protect signs or to ease cleaning of solar cell surfaces. The multi-layer stacks of this disclosure can also be designed as multi-layer lenses in surgical face shields, motocross racing helmets, goggles, and other eye protection devices, or as windshield protectors.

In still other embodiments, the stack of sheets can applied to a variety of information displays having a variety of information display configurations. Such displays include multi-character and especially multi-character, multi-line displays such as liquid crystal displays ("LCDs"), plasma displays, front and rear projection displays, cathode ray tubes ("CRTs") and signage. The stack of sheets can also be used on single-character or binary displays, such as light emitting diodes ("LEDs"), signal lamps and switches. The stack of sheets can be used on illuminated or non-illuminated displays. The stack of sheets are especially useful on displays whose information display area is in the form of a viewing screen having a viewing surface that is susceptible to damage during normal use.

In still other embodiments, the stack of sheets can be used in a variety of portable and non-portable information display devices including PDAs, cell phones (including combination PDA/cell phones), touch-sensitive screens, wrist watches, car navigation systems, global positioning systems, depth finders, calculators, electronic books, CD or DVD players, projection television screens, computer monitors, notebook computer displays, instrument gauges, instrument panel covers, signage such as graphic displays (including indoor and outdoor graphics, bumper stickers, and the like), reflective sheeting, and the like. These devices can have planar viewing faces, or non-planar viewing faces such as the slightly curved face of a typical CRT. Typically the display element is located on or in close physical proximity to a viewing face of the information display device rather than being spaced an appreciable distance there from.

The following examples are for the purpose of illustration only and are not intended to limit the scope of the claims, which are appended hereto.

EXAMPLES

Example 1

700 gauge PET film was coated on its primed surface with a UV cure resin, comprised of, by weight, 15%, tetrahydrofurfuryl acrylate, 53% pentaerythritol tetraacrylate, 26.25% 1,3,5 tris(acryloxyethyl) isocyanurate, 4.5% (UV or visible light) photo initiator, 0.75% slip agent, and 0.5% surfactant at 100% solids. A sheet of 200 gauge high clarity PET was laminated with non-treated side facing the UV cure resin, and subjected to actinic radiation to effect curing. This process was repeated such that a 3 layer HC/PET structure was produced.

The structure was tested for steel wool abrasion resistant and adhesion as each layer was removed from the structure. The UV resin consistently remained adhered to the print treated surface, exhibited good steel wool abrasion resistance (500 gram load 10 cycles) and excellent cross hatch snap tape adhesion. The light transmission and haze was measured and the results are provided in the Table below.

TABLE

| Example | # layers | Primary film thickness | Total thickness (um) | % light transmission | % haze | #0000 resistance |
|---|---|---|---|---|---|---|
| 1 | 3 | 175 | 305 | 89.6% | 1.02 | good |
| 2 | 4 | 100 | 432 | 88.5% | 1.05 | good |
| 3 | | | | | | |

TABLE-continued

| Example | # layers | Primary film thickness | Total thickness (um) | % light transmission | % haze | #0000 resistance |
|---|---|---|---|---|---|---|
| 4 | 7 | 50 micron | 105 | 84.7% | 1.03% | good |
| 5 | 3 | 250 | 381 | >88% | 1.50% | good |
| 6 | 3 | 50 | 160 | | | |

Example 2

100 micron Toyobo A4100 film was coated on its primed surface with a UV cure resin, comprised of, by weight, 12.5% hexane diol diacrylate, 22% ethoxylated trimethyl propane triacrylate, 16% vinyl pyrrolidinone, 46% a urethane acrylate (CN9006 from Sartomer), 4.0% photo-initiator, and 0.5% slip agent at 100% solids. Another sheet of 100 micron A4100 was laminated with the non-treated side facing the UV cure resin, and was subjected to actinic radiation to effect cure. This process was repeated such that a 4-layer HC/PET structure was produced.

This structure was tested for steel wool resistance and adhesion as each layer was removed from the structure. The UV resin remained adhered to the print treated surface and exhibited excellent mechanical and optical properties. Further, samples from example 2 were subjected to high temperature, high humidity cycling and QUV testing without suffering any degradation in performance over the course of the tests.

Example 3

100 micron Toyobo A4100 film was coated with a UV resin at 100% solids. A sheet of Toyobo A4300 with a silicone release layer on a single side, was laminated with the silicone release treated side facing the UV cure resin, and was subjected to actinic radiation to effect cure. This process was repeated such that a 4-layer HC/PET structure was produced.

This structure was tested for steel wool resistance and adhesion as each layer was removed from the structure. The UV resin remained adhered to the print treated surface and exhibited excellent mechanical and optical properties.

Example 4

50 micron high clarity PET was coated with a UV curable formulation on its print receptive side at 100% solids. A sheet of 50 micron high clarity PET was pressure laminated to this surface and subjected to actinic radiation curing. This was repeated to produce a 7 layer structure.

This structure was tested for resistance to steel wool and adhesion as each layer was removed. The UV resin remained adhered to the print treated surface and exhibited excellent mechanical and optical properties.

Example 5

250 micron polycarbonate film was coated with a UV curable formulation on side 1 of the film at 100% solids. A sheet of 50 micron high clarity PET was pressure laminated to this surface (print treated side away from the bonding agent), subject to actinic radiation cure. This process was repeated to produce a 3 layer lens structure (10 mil polycarbonate/removable 2-mil PET/2-mil removable PET).

This structure was tested for resistant to steel wool and adhesion as each layer was removed. The UV resin remained firmly adhered and exhibited excellent #0000 steel wool resistance.

Example 6

50 micron high clarity PET was coated with a cationic UV curable formulation on its print receptive side at 100% solids. A sheet of 50 micron high clarity PET was pressure laminated to this surface and subjected to actinic radiation curing. This was repeated to produce a 3 layer structure.

This structure was tested for resistance to steel wool and adhesion as each layer was removed. The UV resin remained adhered to the print treated surface and exhibited excellent mechanical and optical properties.

1. A stack comprising: a plurality of stacked sheets, each sheet comprises:
a film having a first side, with a print receptive or primed layer, and a second side, with an optional release treated layer; and
a bonding layer that is coated at 100% solids on the first side of the film to releasably attach a second side of a film of an overlying sheet to the first side of an underlying sheet,
wherein each sheet is stacked upon another sheet such that except for a topmost sheet of the stack the bonding layer is in contact with the second side of a film of an overlying sheet, the bonding layer of the topmost sheet defining an outer surface of the stack that protects the topmost sheet of the stack from environmental damage, and wherein the topmost sheet can be removed from the stack of sheets by pulling it away from the stack such that a bonding layer of the underlying sheet form an outer surface of the stack that protects the underlying sheet from environmental damage.

2. The stack of claim 1, wherein the bonding layer is chemical and abrasion resistant.

3. The stack of claim 1, being substantially transparent to visible light.

4. The stack of claim 1, the films comprising clear substantially transparent polymer films.

5. The stack of claim 4, the films comprising polyethylene terephthalate film

6. The stack of claim 4, the films comprising at least one of polycarbonate, PMMA or aliphatic polyurethanes.

7. The stack of claim 4, including films of different polymer types.

8. The stack of claim 1, including between 2 and about 10 sheets.

9. The stack of claim 1, wherein the bonding layer is formed from a bonding agent that comprises at least of: a 100% solids UV cure acrylate formulation, which provides for a chemical and abrasion resistant surface after curing; a 100% solids cationic UV formulation, which provides for a chemical and abrasion resistant surface after curing; a dual cure cationic and radical 100% solids UV formulation, which provides chemical and abrasion resistance after curing; or a thermally cured epoxy, which provides chemical and abrasion resistance after curing.

10. The stack of claim 1, wherein the bonding layer includes UV absorbers and light stabilizers at an effective amount to inhibit degradation of the stack from UV radiation.

11. The stack of claim 1, wherein the bonding layer thickness is between about 1 micron and about 20 microns.

12. The stack of claim 1, wherein the print receptive or prime layer is formed by treating the film with at least one of corona discharge treatment, flame treatment, aziridines, polyurethanes, acrylics, polyvinylidene chlorides and solution coated polymers.

13. The stack of claim 1, wherein the optional release treatment layer comprises at least one of silicone polymers, reactive cure silicones, fluoropolymers or fluorosilicones.

14. The stack of claim 1, wherein each film has a thickness between about 25 microns and about 750 microns.

15. The stack of claim 1, being provided on at least one of splash visors, racing visors, surgical visors, helmet lens systems, and face shields.

16. An article comprising a plurality of stacked sheets, each sheet comprises:

a film having a first side, with a print receptive or primed layer, and a second side, with an optional release treated layer; and a bonding layer that is coated at 100% solids on the first side of the film and cured with actinic radiation to releasably attach a second side of a film of an overlying sheet to the first side of an underlying sheet; and a clear pressure sensitive adhesive with a suitable protective release film provided on the bottom sheet of the stack for mounting of the stack to various devices and surfaces, wherein each sheet is stacked upon another sheet such that except for a topmost sheet of the stack the bonding layer is in contact with the second side of a film of an overlying sheet, the bonding layer of the topmost sheet defining an outer surface of the stack that protects the topmost sheet of the stack from environmental damage, and wherein the topmost sheet can be removed from the stack of sheets by pulling it away from the stack such that a bonding layer of the underlying sheet form an outer surface of the stack that protects the underlying sheet from environmental damage.

17. The article of claim 16, being in the form of multilayer vandalism and damage resistant stack that is laminated to at least one of windows of buildings, mirrors, commercial vehicles, windshields of vehicles or to windows of trains, rail cars or light rail cars in public transit systems.

18. The article of claim 16, comprising a stepped edge or corner to aid in removal of damaged sheets.

19. The article of claim 16, wherein the bonding layer is chemical and abrasion resistant.

20. The article of claim 16, being substantially transparent to visible light.

From the above description of the invention, those skilled in the art will perceive improvements, changes and modifications. Such improvements, changes, and modifications are within the skill of the art and are intended to be covered by the appended claims. All patents and publications identified herein are incorporated by reference in their entirety.

Having described the invention the following is claimed:

1. A stack comprising: a plurality of stacked sheets, each sheet comprises:

a film having a first side, with a print receptive or primed layer, and a second side, with an optional release treated layer; and a bonding layer that is coated at 100% solids on the first side of the film, wherein the bonding layer releasably adheres a second side of a film of an overlying sheet to the first side of an underlying sheet, wherein each sheet is stacked upon another sheet such that except for a topmost sheet of the stack the bonding layer is in direct contact with the second side of a film of an overlying sheet or with an optional release treated layer of an overlying sheet if present, the bonding layer of the topmost sheet defining an outermost surface of the stack that protects the topmost sheet of the stack from environmental damage, wherein the topmost sheet can be removed from the stack of sheets by pulling it away from the stack such that a bonding layer of the underlying sheet forms an outermost surface of the stack that protects the underlying sheet from environmental damage, and wherein the bonding layer of each sheet is more resistant to abrasion than the underlying film and is resistant to scratching with #0000 steel wool.

2. The stack of claim 1, being substantially transparent to visible light.

3. The stack of claim 1, each of the films comprising substantially transparent polymer film.

4. The stack of claim 3, each of the films comprising polyethylene terephthalate film.

5. The stack of claim 3, each of the films comprising at least one of polycarbonate, PMMA or aliphatic polyurethanes.

6. The stack of claim 3, including films of different polymers.

7. The stack of claim 1, including between 2 and about 10 sheets.

8. The stack of claim 1, wherein the bonding layer of each sheet is formed from a bonding agent that comprises at least one of:

a 100% solids UV cure acrylate formulation;

a 100% solids cationic UV formulation;

a dual cure cationic and radical 100% solids UV formulation; or a thermally cured epoxy.

9. The stack of claim 1, wherein the bonding layer of each sheet includes UV absorbers and light stabilizers at an effective amount to inhibit degradation of the stack from UV radiation.

10. The stack of claim 1, wherein the bonding layer thickness of each sheet is between about 1 micron and about 20 microns.

11. The stack of claim 1, wherein the print receptive or primed layer of each film is formed by treating the film with at least one of corona discharge treatment, flame treatment, aziridines, polyurethanes, acrylics, polyvinylidene chlorides and solution coated polymers.

12. The stack of claim 1, wherein the optional release treated layer of each film comprises at least one of silicone polymers, reactive cure silicones, fluoropolymers or fluorosilicones.

13. The stack of claim 1, wherein each film has a thickness between about 25 microns and about 750 microns.

14. The stack of claim 1, being provided on at least one of splash visors, racing visors, surgical visors, helmet lens systems, and face shields.

15. An article comprising a plurality of stacked sheets, each sheet comprises:

a film having a first side, with a print receptive or primed layer, and a second side, with an optional release treated layer; and a bonding layer that is coated at 100% solids on the first side of the film and cured with actinic radiation to releasably adhere a second side of a film of an overlying sheet to the first side of an underlying sheet; and a clear pressure sensitive adhesive with a protective release film provided on the bottom sheet of the stacked sheets for mounting of the stacked sheets to various devices and surfaces, wherein each sheet is stacked upon another sheet such that except for a topmost sheet of the stack the bonding layer is in direct contact with the second side of a film of an overlying sheet or with an optional release treated layer of an overlying sheet if present, the bonding layer of the topmost sheet defining an outermost surface of the stack that protects the topmost sheet of the stack from environmental damage, wherein the topmost sheet can be removed from the stack of sheets by pulling it away from the stack such that a bonding layer of the underlying sheet forms an outermost surface of the stack that protects the underlying sheet from environmental damage, and wherein the bonding layer of each sheet is more resistant to abrasion than the underlying film and is resistant to scratching with #0000 steel wool.

16. The article of claim 15, being in the form of a multi-layer vandalism and damage resistant stack that is laminated to at least one of windows of buildings, mirrors, commercial vehicles, windshields of vehicles or to windows of trains, rail cars or light rail cars in public transit systems.

17. The article of claim 15, comprising a stepped edge or corner to aid in removal of damaged sheets.

18. The article of claim 15, being substantially transparent to visible light.

* * * * *